United States Patent
Mudulodu et al.

(10) Patent No.: US 7,706,459 B2
(45) Date of Patent: Apr. 27, 2010

(54) SYSTEM AND METHOD FOR CHANNEL ESTIMATION

(75) Inventors: Sriram Mudulodu, Santa Clara, CA (US); Louay Jalloul, Santa Clara, CA (US)

(73) Assignee: Beceem Communications Inc., Santa Clara, CA (US)

( * ) Notice: Subject to any disclaimer, the term of this patent is extended or adjusted under 35 U.S.C. 154(b) by 864 days.

(21) Appl. No.: 11/505,567

(22) Filed: Aug. 16, 2006

(65) Prior Publication Data

US 2007/0211806 A1 Sep. 13, 2007

Related U.S. Application Data

(60) Provisional application No. 60/781,182, filed on Mar. 10, 2006.

(51) Int. Cl.
*H04K 1/10* (2006.01)
(52) U.S. Cl. .......................... 375/260; 375/316
(58) Field of Classification Search .............. 375/260, 375/130, 136, 147, 347; 370/208–211
See application file for complete search history.

(56) References Cited

U.S. PATENT DOCUMENTS

| | | | |
|---|---|---|---|
| 6,298,035 B1 * | 10/2001 | Heiskala | 370/206 |
| 7,436,757 B1 * | 10/2008 | Wilson et al. | 370/203 |
| 2002/0122465 A1 | 9/2002 | Agee et al. | |
| 2003/0142730 A1 | 7/2003 | Lin | |
| 2004/0071193 A1 | 4/2004 | Atarashi et al. | |
| 2005/0122947 A1 | 6/2005 | Wang et al. | |
| 2006/0023772 A1 | 2/2006 | Mudulodu et al. | |
| 2006/0239226 A1 * | 10/2006 | Khan | 370/329 |
| 2007/0159959 A1 * | 7/2007 | Song et al. | 370/208 |
| 2007/0195865 A1 * | 8/2007 | Joetten et al. | 375/148 |
| 2009/0080561 A1 * | 3/2009 | Wang et al. | 375/267 |

OTHER PUBLICATIONS

Tufvesson et al., Pilot Assisted Channel Estimation for OFDM in Mobile Cellular Systems, Proceedings IEEE Vehicular Technology Conference, pp. 1639-1643, May 1997.

Coleri et al., Channel Estimation Techniques Based on Pilot Arrangement in OFDM Systems, Sep. 2002, IEEE Transactions on Broadcasting, vol. 48 No. 3.

* cited by examiner

*Primary Examiner*—Emmanuel Bayard
(74) *Attorney, Agent, or Firm*—Sawyer Law Group, P.C.

(57) ABSTRACT

Systems and methods are provided for improving a channel estimate in a signal communication system. The systems and methods improve the channel estimation quality and/or the delay spread of the channels that can be estimated. The combining of symbols operates to increase the density of pilots that are processed to provide the channel estimate.

16 Claims, 7 Drawing Sheets

SYSTEM AND METHOD FOR CHANNEL ESTIMATION

RELATED APPLICATION

This application claims priority to U.S. Provisional Patent Application No. 60/781,182, filed Mar. 10, 2006, which is entitled "Method for Improved Channel Estimation for Multicast and Broadcast Service."

BACKGROUND

Wireless digital communications systems are poised to offer a cost-effective alternative to cable and DSL data services. For example, the so-called "WiMAX" technology, based on the IEEE 802.16e air interface standard, is a promising framework for broadband wireless applications. It has the potential to enable full internet and digital voice services for both fixed and mobile users. The physical layer architecture for IEEE 802.16e Orthogonal Frequency Division Multiple Access (OFDMA) systems is based on orthogonal frequency-division multiplexing (OFDM) modulation.

OFDM, or one of its forms, provides a promising and cost effective technology to combat multipath effects of the wireless channel, including advantages at the link and system levels. The available frequency band is divided into a group of subcarriers where each subcarrier experiences frequency flat fading. Subcarriers can be used for transmitting pilots and data symbols. Subcarriers that do not have any data/pilot transmission and are called null subcarriers.

In OFDM systems, the channel between the transmitted symbols and the received symbols must be estimated in order to decipher the transmitted data. An important characteristic of the wireless channel is its delay spread, which is the range of delays of the multipath that the signal experiences. Some channels have small delay spread, and some have large delay spread. A channel may also be relatively flat in the frequency domain or equivalently have a low delay spread in the time domain. Pilot tones embedded in the transmission and known to the receiver are used to perform estimates of the channel.

In the context of the OFDMA in WiMAX, current channel estimation techniques utilize a uniform pilot spacing of 12 sub-carriers in a data zone, referred to as the full usage of sub-channels (FUSC) zone. However, this pilot spacing limits the delay spread of the channel that can be estimated. For most channels, this provides reasonable performance in the regular mode of transmission where a subscriber station (SS) tries to decode the signal transmitted by a single base station (BS). However, in a special mode of transmission called the MBS (Multicast and Broadcast Service) mode, multiple BSs transmit the same signal.

In the MBS mode, an SS attempts to decode the sum of the signals from multiple BSs. The effective channel seen by the SS in this mode, has a large delay spread relative to transmission from a single BS (i.e. relative to the Unicast case). Even if the inherent channel between any BS and the SS is frequency flat, the composite channel consisting of the channels from each BS to the SS will no longer be frequency flat. For wideband channels (e.g. 5, 10 and 20 MHz channel bandwidths), the individual channel itself is not flat, but frequency selective. This is greatly enhanced when multiple BS transmit the same signal. The delay spread that is experienced is larger than in the Unicast scenario. Thus, it is desirable to improve channel estimation quality and hence also the link level quality in such situations.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

DETAILED DESCRIPTION

Embodiments of systems and methods are provided for improving a channel estimate in a signal communication system. The systems and methods are configured to combine multiple symbols before estimating a channel. For example, the systems and methods are configured to combine multiple symbols before estimating a channel in an orthogonal frequency-division multiplexing (OFDM) communication system. In an embodiment, the combining of consecutive symbols operates to increase the density of pilot tones or pilots that are processed to provide a channel estimate. The combining of consecutive symbols also operates to decrease the spacing between pilots.

Embodiments of a system and method are provided to estimate and track a time-varying frequency-selective channel. In an embodiment, a system and method operate to estimate and track a time-varying frequency-selective channel in a multi-carrier system, such as an OFDM communication system, wherein a plurality OFDM symbols are combined to thereby increase pilot density of a number of pilots that are associated with the combined OFDM symbols. Various embodiments operate to combine symbols prior to determining the location of the N (e.g. a design parameter) best taps and to obtain an associated gain for these taps. Various processes may be used to determine the N best taps based in part on the time domain response obtained from the symbol combining. Also, tracking in the time domain can be performed in various ways in conjunction with the symbol combining methodologies described herein.

In the following description, numerous specific details are introduced to provide a thorough understanding of, and enabling description for, embodiments of the invention. One skilled in the relevant art, however, will recognize that the invention can be practiced without one or more of the specific details, or with other components, systems, etc. In other instances, well-known structures or operations are not shown, or are not described in detail, to avoid obscuring aspects of the invention.

Figure 1A:
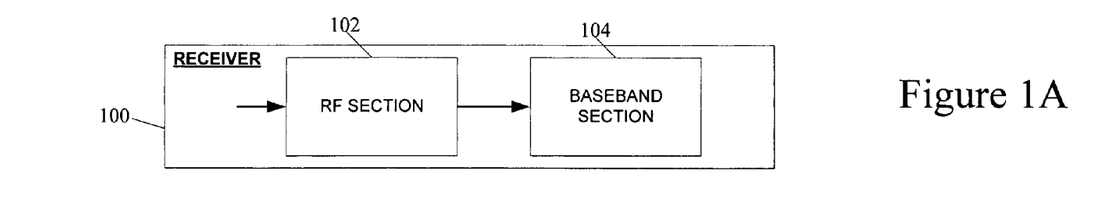
FIGS. 1A-1C are block diagrams which depict a radio frequency (RF) receiver and associated components, under an embodiment.
Figure 1B:
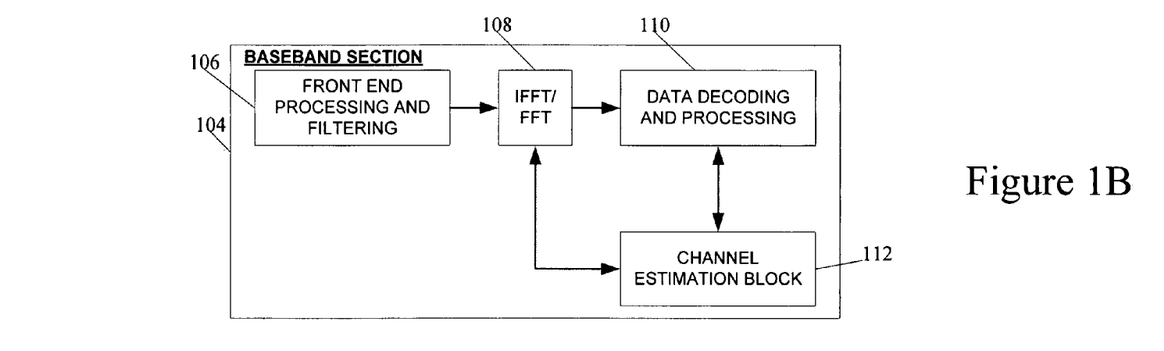
Figure 1C:
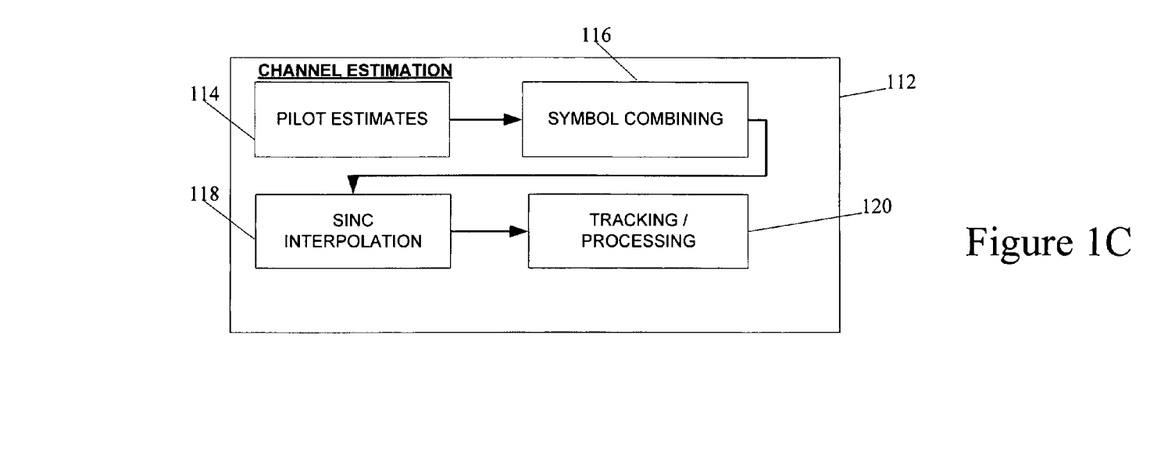

FIGS. 1A-1C are block diagrams which depict a receiver 100 and associated components for receiving and processing a signal to provide a channel estimate under an embodiment. The receiver 100 includes at least one processor running under control of at least one processing algorithm, program, or routine, to process a signal, such as a wireless signal. The channel estimate may be provided based in part on the processing of various signal characteristics of a received signal as described below. For example, the receiver 100 and associated components can operate to receive and process a wireless signal, such as an OFDM signal, and provide a channel estimate based thereon. In an embodiment, the receiver 100 can provide a channel estimate based in part on the combining and processing of OFDM symbols, such as consecutive OFDM symbols described below.

The combining of OFDM symbols, such as consecutive OFDM symbols, operates to increase the density of pilot tones or pilots that are processed to provide the channel estimate. Additionally, the combining of OFDM symbols operates to decrease the spacing between pilots. The resultant increased pilot density and decreased pilot spacing increases the delay spread of the channel that can be estimated and thereby improves the performance for systems that may experience large delay spreads.

The receiver 100 and associated components can also be components or subsystems within a larger communication system or network. Furthermore, while the description discusses various embodiments of OFDM signal communication systems and methods, those skilled in the art appreciate the extension of the teachings to other communication systems and methods and the teachings are not intended to be limited to the embodiments and examples described herein. Before continuing with the description of FIG. 1, a general description of an OFDM communication system is presented.

In an OFDM system, information can be presented in the time domain by way of OFDM symbols and in the frequency domain by way of subcarriers (see FIGS. 2-5). The overall system bandwidth is partitioned into a number of orthogonal subcarriers. These subcarriers encompass the range of frequencies (or bandwidth) over which OFDM symbols are transmitted. Each subcarrier can be considered to be an independent transmission channel that is used to transmit data and may experience different effective channels and associated complex channel gains due to fading, multipath, and other effects. OFDM systems may use the frequency diversity of the multipath channel by coding and interleaving information before transmitting on the subcarriers.

An OFDM symbol is a multiplex of orthogonal subcarriers, created in the frequency domain and converted to a time domain waveform using an Inverse Fast Fourier Transform (IFFT). Individual symbols are sent by modulating tones within each subcarrier. An OFDM frame is a sequence of OFDM symbols, where each OFDM symbol is the time-domain representation of the multiplexed subcarriers following the IFFT. A cyclic prefix is added to decrease and/or eliminate intersymbol interference (ISI). The OFDM receiver receives the signal, removes the cyclic prefix (if any), and performs a Fast Fourier Transform (FFT) to return to the frequency domain.

FIG. 1A depicts a receiver 100, such as an OFDM receiver for example, that includes a radio frequency (RF) section 102 and a baseband section 104. The RF section 102 is configured to convert the received RF input signal to baseband.

FIG. 1B shows the baseband section 104 in greater detail. As shown in FIG. 1B, the baseband section 104 includes a front end processing and filtering component 106, an IFFT/FFT component 108, a data decoding and processing component 110, and a channel estimation component 112. The baseband section 104 is configured to process the baseband signal and provide a channel estimate based in part on the functionality of the channel estimation component 112.

FIG. 1C shows the channel estimation component 112 in greater detail. As shown in FIG. 1C, the channel estimation component 112 includes a pilot estimating component 114, a combining component 116, a sinc interpolation component 118, and a tracking/processing component 120. As described below, the channel estimation component 112 is configured to provide a channel estimate based in part on a combination of consecutive symbols, such as consecutive OFDM symbols.

Figure 2:
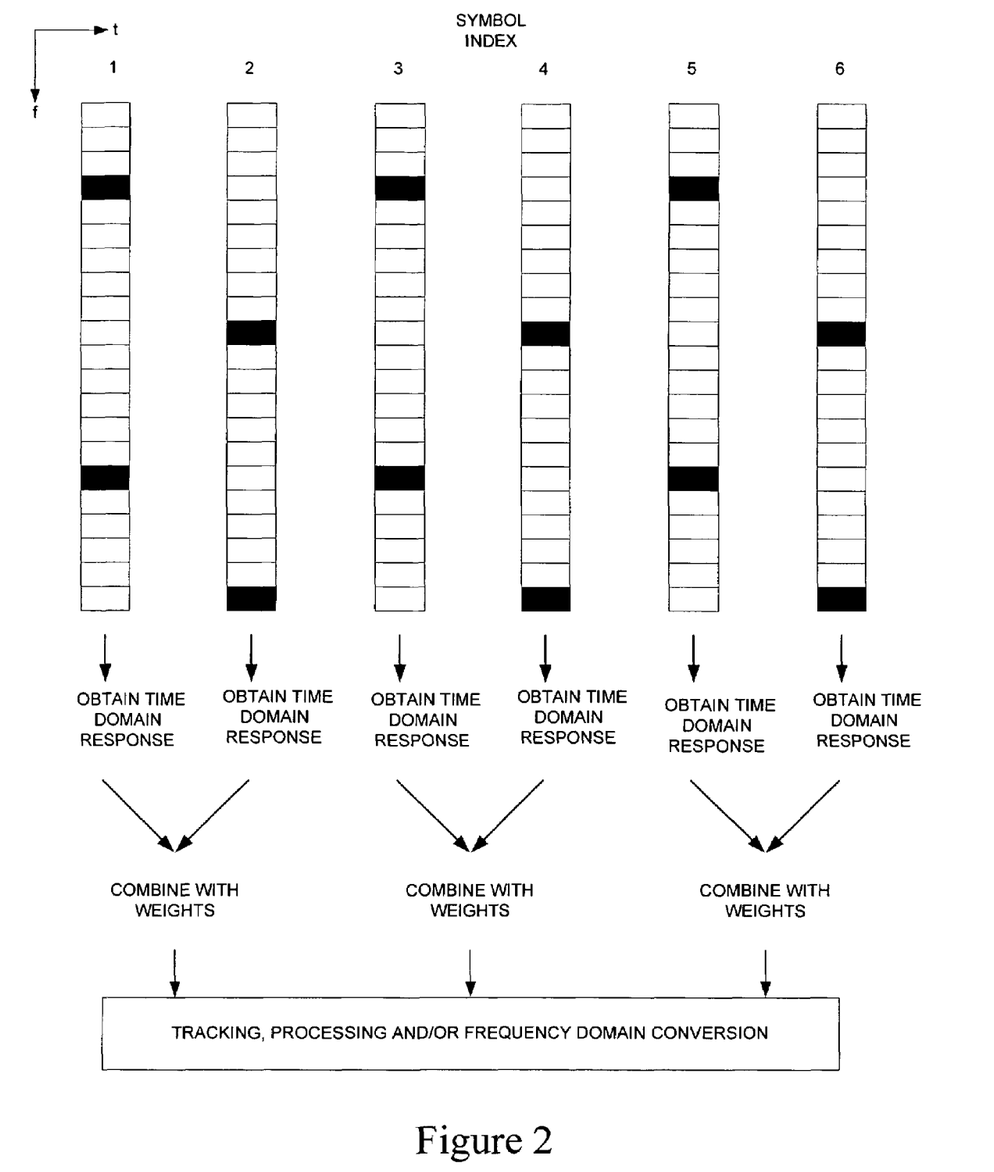
FIG. 2 is a functional diagram depicting a procedure for estimating a channel, under an embodiment.

FIG. 2 is a functional diagram depicting a procedure for estimating a channel, under an embodiment. As described above, channel estimation is described in the context of an OFDM communication system, but is not so limited. The horizontal axis represents time (increasing scale left to right) and the vertical axis represents frequency (increasing scale top to bottom). A number of OFDM symbols 1-6 are shown in FIG. 2. The symbol index delineates each OFDM symbol. While six OFDM symbols are shown, it is appreciated that the number of OFDM symbols may be greater or fewer.

Each OFDM symbol includes a number of subcarriers. Furthermore, each OFDM symbol is associated with a number of data subcarriers (represented by the white boxes) and a number of pilot subcarriers (represented by the shaded boxes). The subcarriers may be modulated with data, pilots, or other information. As shown in FIG. 2, and in accordance with this embodiment, every other OFDM symbol includes the same pilot subcarrier pattern. That is, each pilot subcarrier is relatively positioned at a specific location with respect to a preceding or subsequent pilot subcarrier. Moreover, for this example, every 12 h subcarrier is a pilot tone. However, other pilot patterns may be used.

Pilot tones or pilot symbols (hereinafter referred to as "pilots") may be characterized as special data symbols which correspond to a particular modulation scheme. Pilots can be used in a communication system to estimate the channel and/or to correct frequency and timing offsets between one or more receivers and one or more transmitters. OFDM pilots are typically of higher power and are known to the receiver as compared to valid data carrying OFDM subcarriers. That is, an OFDM receiver typically has prior knowledge of transmitted pilots, and can compare the received pilots to estimate the channel gain on these pilots.

Thereafter, an interpolation technique or other estimation method may be performed to obtain an estimate of the channel gain on other subcarriers that contain data. One such technique uses sinc/FFT based interpolation. In this method, an IFFT is performed on the pilot channel estimates (the data tones are nulled prior to performing an IFFT) to obtain a time domain channel estimate. This estimate is then appropriately windowed (e.g. a window of this response is taken and the rest are nulled) and an FFT is performed to go back to the frequency domain. The resulting frequency domain output is the interpolated frequency domain channel estimate. In this method, the delay spread of the channels that can be estimated is directly related to the pilot density. As described herein, the combining of signals before estimation operates to increase the pilot density and thereby improve the delay spread of the channels that can be estimated.

The wireless channel impulse response in the time domain contains significant energy taps at certain propagation delays and not all delays. In other words the power delay profile (PDP) consists of powers of the taps at certain small set of delays as opposed to having power on all the delays. The interpolation technique described above can also use this information in several ways. For example, taps can be nulled within the window (in the time domain) that do not correspond to significant energy and/or the best N (highest N in energy) taps in the PDP can be considered while interpolating.

Returning to FIG. 2, and in accordance with this embodiment, once the channel estimate on the pilot tones is obtained, an IFFT is performed to go to the time domain, using a component such as the IFFT component 108 of FIG. 1. Thereafter, the time domain estimates across the first and second OFDM symbols, the third and fourth OFDM symbols, and the fifth and sixth OFDM symbols are combined. Combining refers to combining the pilots in the frequency domain or combining the channel estimates in the time domain, but is not so limited. In other words, the pilots across multiple symbols are combined as if they originate from one symbol with higher pilot density. The channel estimates on these pilots are then used for interpolation in further processing. In the case of combining the time domain channel estimates, the individual time domain channel estimates from each symbol are combined to obtain a single time domain estimate. This is used in sinc/interpolation process and further processing.

The combining of the time domain response across third and fourth OFDM symbols can occur after estimating the channel based on the combination of the first and second OFDM symbols, concurrently therewith, or at another desired time. Likewise, the combining of the fifth and sixth symbols can occur after estimating the channel based on the combination of the first and second symbols and/or the third and fourth symbols, or concurrently with the preceding combinations.

It is appreciated that the combining of OFDM symbols follows from the realization that the channel is almost constant across two consecutive symbols. As shown in FIG. 2, the combining of consecutive OFDM symbols may include weighting operations. This may be useful in high Doppler situations. For example, the weights of the weighting operation may be selected depending on Doppler and/or other factors. However, the combining can also occur without weighting operations. The resulting combination of FIG. 2 results in a pilot spacing of six (6) subcarriers.

As described above, sinc interpolation may also use PDP information. In an embodiment, the PDP may be obtained from the time domain channel estimates which are obtained after combining consecutive OFDM symbols. The energy of the taps in the time domain can then be averaged across multiple such estimates to obtain the PDP. The PDP estimation can be performed prior to doing a complete interpolation. Thereafter, the PDP estimation may be updated from time to time while the interpolation is being performed based on the best N taps from the latest available PDP information.

As described above, the combining of consecutive OFDM symbols increases the pilot density. The combining technique results in the doubling of the delay spread of the channel that can be estimated using an interpolation technique, such as an FFT based interpolation technique. For example, the combining technique results in the doubling of the delay spread of the channel that can be estimated from NFFT/12 to NFFT/6. Thus, channel estimation in the MBS mode or for channels with large delay spread is improved. In an embodiment, a pair of symbols can be assigned the same channel estimate. Such an embodiment is useful for systems wherein the symbol period is much smaller as compared to the inverse of the Doppler.

With continuing reference to FIG. 2, channel tracking, other processing, and/or conversion to the frequency domain can be performed on the foregoing results. Channel tracking may be performed across successive pairs after combining in the time or frequency domain. In an embodiment, band edge correction can be applied to improve the channel estimate near the guard bands. Furthermore, "Channel Estimation Techniques Based on Pilot Arrangement in OFDM System" by Sinem Coleri, Mustafa Ergen, Anuj Puri, and Ahmad Bahai, and "Pilot Assisted Channel Estimation for OFDM in Mobile Cellular Systems" by Fredrik Tufvesson and Torleiv Maseng describe channel estimation techniques for OFDM systems that may be referred to in conjunction with the teachings herein.

Figure 3:
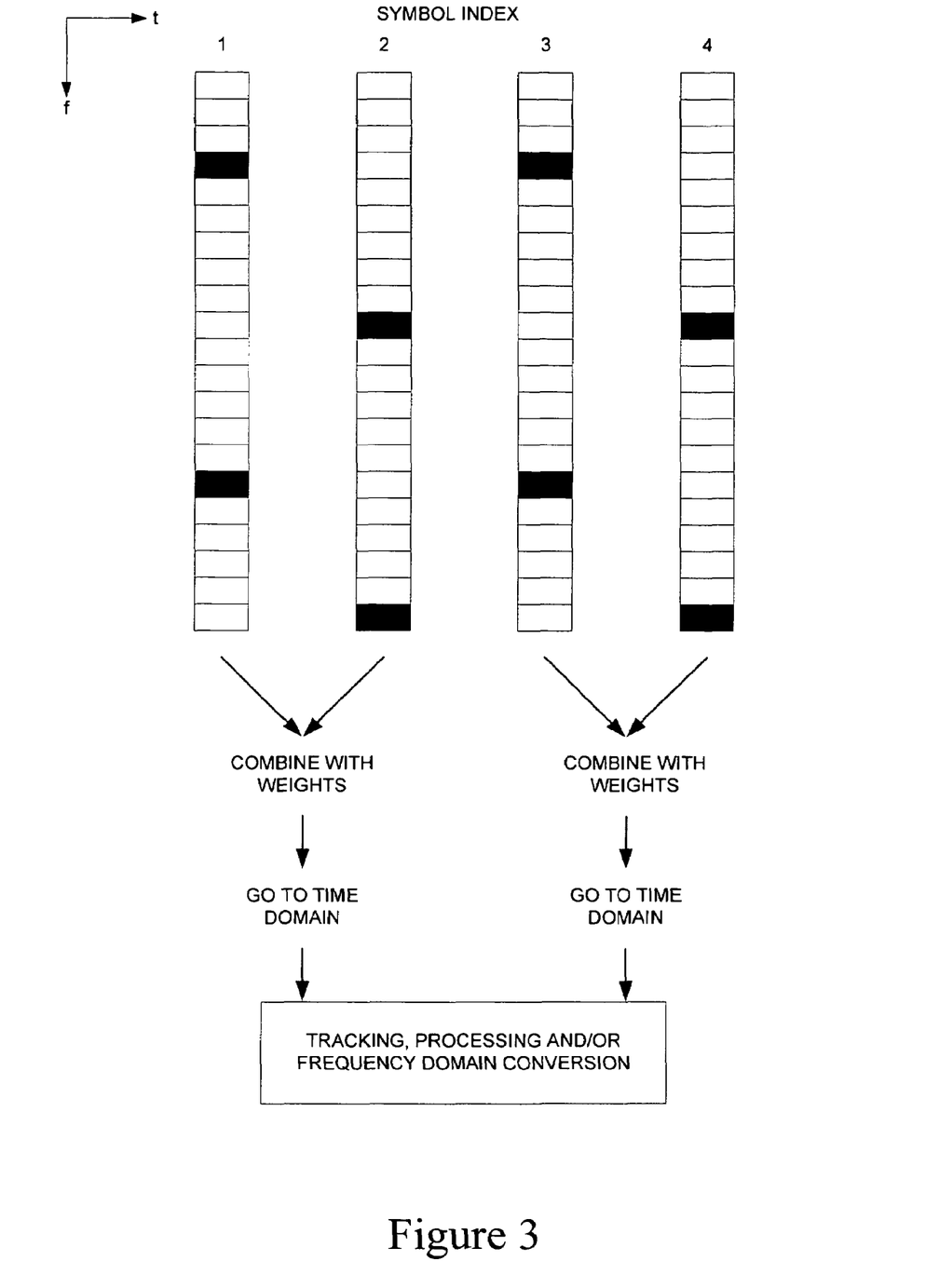
FIG. 3 is a functional diagram depicting a procedure for estimating a channel, under an embodiment.

FIG. 3 is a functional diagram depicting a procedure for estimating a channel, under an embodiment. The channel estimation is again described in the context of an OFDM communication system, but is not so limited. The horizontal axis represents time (increasing scale left to right) and the vertical axis represents frequency (increasing scale top to bottom). A number of OFDM symbols 1-4 are shown, wherein the symbol index delineates each OFDM symbol. While four (4) OFDM symbols are shown, it is appreciated that the number of OFDM symbols may be greater or fewer.

As is shown in FIG. 3, the pilot subcarriers repeat every twelve (12) subcarriers for each OFDM symbol. Other pilot patterns may also be used. The pilot channel estimates of the first and second OFDM symbols, and the third and fourth OFDM symbols are combined in the frequency domain. The combining of the third and fourth OFDM symbols can occur after estimating the channel based on the combination of the first and second OFDM symbols, concurrently therewith, or at some other desired time.

The combining of consecutive OFDM symbols increases the pilot density and decreases the relative spacing between pilots. The combining may include interleaving, multiplexing, and/or other combining methods. As shown in FIG. 3, the combining of consecutive OFDM symbols in the frequency domain includes weighting operations.

Weights may be selected depending on Doppler and other factors for example. The combining can also be accomplished without weighting operations. The resulting combination of FIG. 3 results in an enhanced pilot spacing of six (6) subcarriers.

The combined OFDM symbols are then converted to the time domain using an IFFT, such as the IFFT component 108 of FIG. 1. Thereafter, the power delay profile (PDP) computation for the best N taps (or taps with the highest energy) can be obtained. FFT/sinc interpolation is then used to estimate the channel for the data subcarriers based in part on the best N taps according to the pilot-based channel estimate using the combined OFDM symbols. The combining of the OFDM symbols in the frequency domain results in the doubling of the delay spread of the channel that can be estimated using an FFT based interpolation technique. Thus, the performance in MBS mode or for channels with large delay spread is improved.

With continuing reference to FIG. 3, channel tracking, other processing, and/or conversion to the frequency domain can be performed on the foregoing results. Band edge correction also may be applied to improve the channel estimate near the guard bands. Channel tracking may be performed across successive pairs after combining, in the time or frequency domain. In an embodiment, a pair of symbols may be assigned the same channel estimate which is useful for systems wherein the symbol period is much smaller as compared to the inverse of the Doppler.

Figure 4:
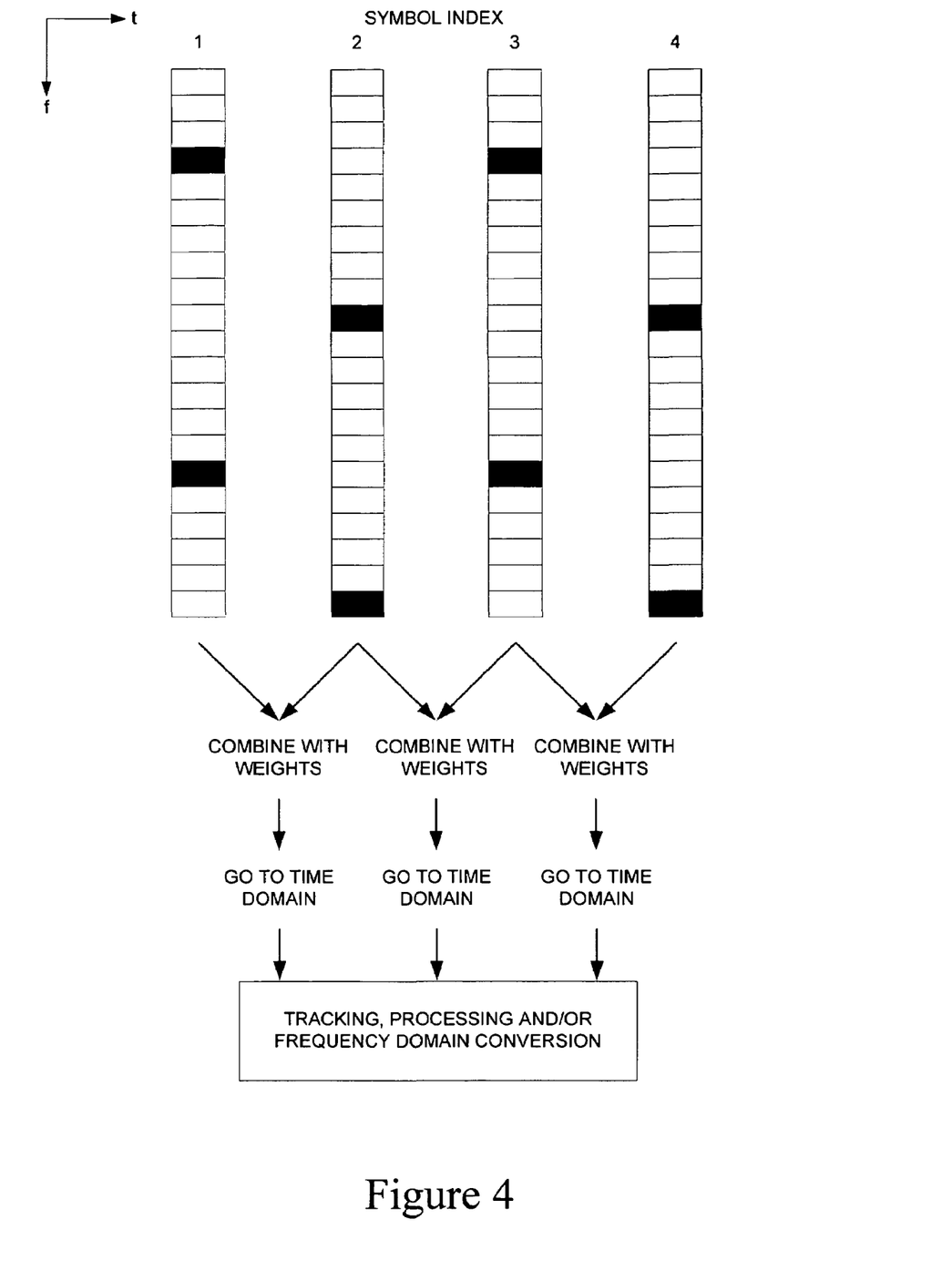
FIG. 4 is a functional diagram depicting a procedure for estimating a channel, under an embodiment.

FIG. 4 is a functional diagram depicting a procedure for estimating a channel, under an embodiment. The channel estimation is again described in the context of an OFDM communication system, but is not so limited. The horizontal axis represents time (increasing scale left to right) and the vertical axis represents frequency (increasing scale top to bottom). A number of OFDM symbols 1-4 are shown, wherein the symbol index delineates each OFDM symbol. While four (4) OFDM symbols are shown, it is appreciated that the number of OFDM symbols may be greater or fewer.

Each OFDM symbol includes a number of subcarriers depending on the frequency division used. Each OFDM symbol is associated with a number of data subcarriers (represented by the white boxes) and a number of pilot subcarriers (represented by the shaded boxes). The subcarriers may be modulated with data, pilots, or other information. In accordance with this embodiment, every other OFDM symbol includes the same pilot subcarrier pattern, wherein each pilot subcarrier is relatively positioned at a specific location with respect to a preceding or subsequent pilot subcarrier. The pilot subcarriers repeat every twelve (12) subcarriers for each OFDM symbol. Other pilot patterns may also be used. As shown in FIG. 4, the pilot channel estimates of the first and second OFDM symbols, second and third OFDM symbols, and the third and fourth OFDM symbols are combined in the frequency domain. That is, the combining is an overlapping type of combining of the OFDM symbols. Stated another way, with the exception of the first and last OFDM symbols, each OFDM symbol is involved in two pairs. In the general case of M (instead of symbol pairs) symbols, the system and method can process a window of M symbols which shifts by one symbol each time a new symbol arrives. When M is large, and Doppler is high, such an implementation provides a meaningful benefit. In this embodiment, the channel estimate is different for different OFDM symbols and is not assumed to be the same across the pairs of OFDM symbols.

The combining of the second and third OFDM symbols and/or the third and fourth OFDM symbols can occur after estimating the channel based on the combination of the first and second OFDM symbols, concurrently therewith, or at some other desired time. Again, the combining of consecutive OFDM symbols increases the pilot density, while decreasing the relative spacing between pilots. The combining may include interleaving, multiplexing, and/or other combining methods. As shown in FIG. 4, the combining of consecutive OFDM symbols in the frequency domain includes weighting operations. For example, weights may be selected depending on Doppler and other factors. The combining can also be accomplished without weighting operations. The resulting combination of FIG. 4 results in an enhanced pilot spacing.

The combined OFDM symbols are then converted to the time domain using an IFFT, such as the IFFT component 108 of FIG. 1. FFT/sinc interpolation is then used to estimate the channel for the data subcarriers. In an embodiment, the power delay profile (PDP) computation may be performed and used in the interpolation process. The combining of the OFDM symbols in the frequency domain results in an increase of the delay spread of the channel that can be estimated using an FFT based interpolation technique. Thus, the performance in MBS mode or for channels with large delay spread is improved.

Channel tracking, other processing, and/or conversion to the frequency domain can be performed on the foregoing results. Band edge correction also may be applied to improve the channel estimate near the guard bands. Channel tracking can be performed either in the frequency domain or in the time domain (prior to conversion back to the frequency domain), but after symbol combining. In various embodiments, the overlapping type of combining may be performed in the time domain by combining the respective channel estimates, as described above.

Figure 5:
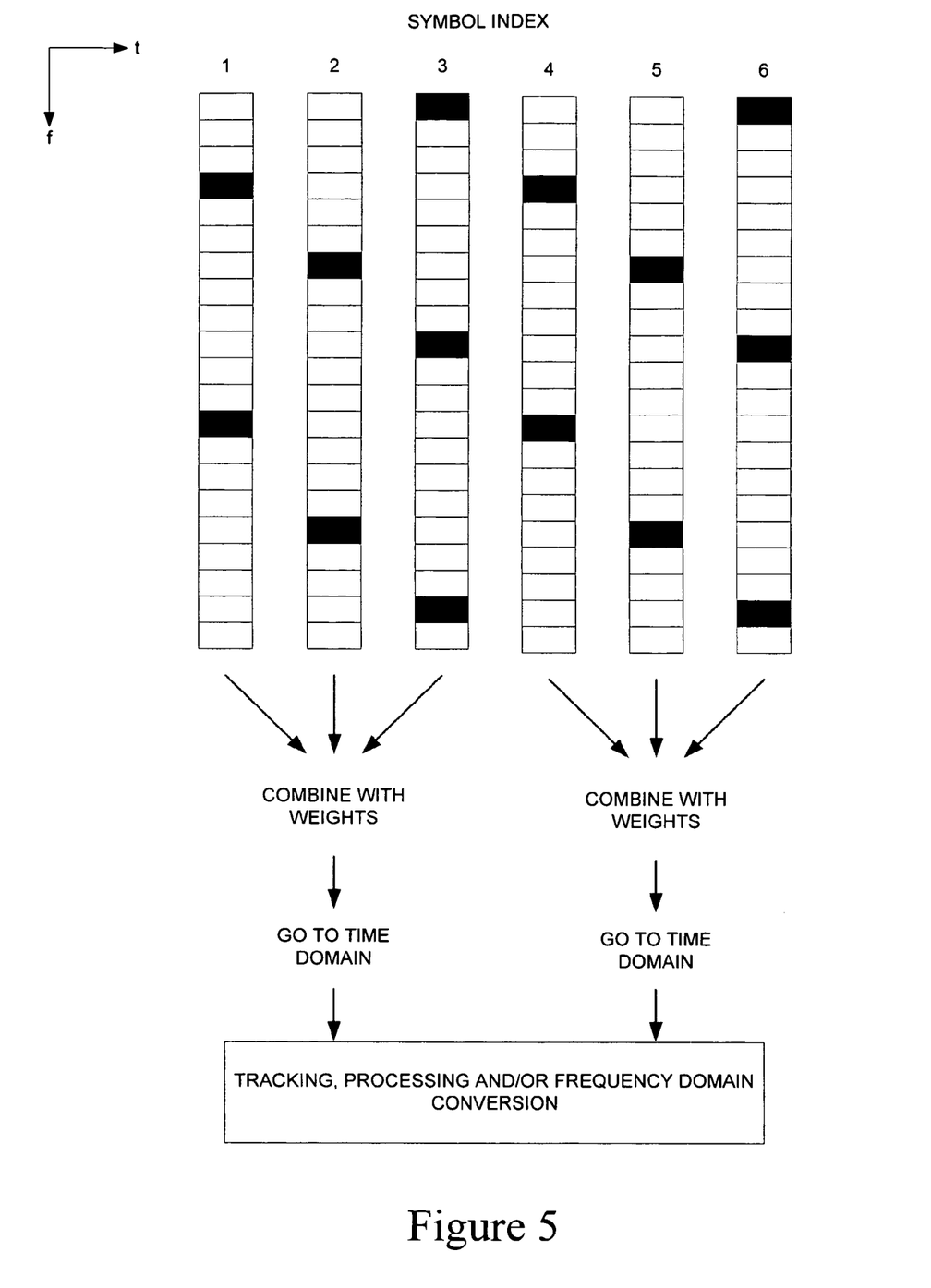
FIG. 5 is a functional diagram depicting a procedure for estimating a channel, under an embodiment.

FIG. 5 is a functional diagram depicting a procedure for estimating a channel, under an embodiment. The channel estimation is again described in the context of an OFDM communication system, but is not so limited. The horizontal axis represents time (increasing scale left to right) and the vertical axis represents frequency (increasing scale top to bottom). A number of OFDM symbols 1-6 are shown, wherein the symbol index delineates each OFDM symbol. While six (6) OFDM symbols are shown, it is appreciated that the number of OFDM symbols may be greater or fewer.

Each OFDM symbol includes a number of subcarriers depending on the frequency division used. Each OFDM symbol is associated with a number of data subcarriers (represented by the white boxes) and a number of pilot subcarriers (represented by the shaded boxes). The subcarriers may be modulated with data, pilots, or other information. In accordance with this embodiment, every other OFDM symbol includes the same pilot subcarrier pattern, wherein each pilot subcarrier is relatively positioned at a specific location with respect to a preceding or subsequent pilot subcarrier. The pilot subcarriers repeat every nine (9) subcarriers for each OFDM symbol. Other pilot patterns may also be used.

As shown in FIG. 5, the pilot channel estimates on the first, second, and third OFDM symbols, and the fourth, fifth, and sixth OFDM symbols are combined in the frequency domain. That is, the combining includes the combining of three (3) consecutive OFDM symbols. In Optional FUSC (OPFUSC) zone of the 802.16e standard for example, three (3) symbols may be combined at the receiver to improve the pilot density three-fold from spacing of nine (9) to a spacing of three (3).

The combining of the fourth, fifth, and sixth OFDM symbols can occur after estimating the channel based on the combination of the first, second, and third OFDM symbols, concurrently therewith, or at some other desired time. Again, the combining of consecutive OFDM symbols increases the pilot density, while decreasing the relative spacing between pilots. The combining may include interleaving, multiplexing, and/or other combining methods. As shown in FIG. 5, the combining of consecutive OFDM symbols in the frequency domain includes weighting operations. For example, weights may be selected depending on Doppler and other factors. The combining can also be accomplished without weighting operations. The resulting combination of FIG. 5 results in an enhanced pilot spacing.

The combined OFDM symbols are then converted to the time domain using an IFFT, such as the IFFT component 108 of FIG. 1. FFT/sinc interpolation is then used to estimate the channel for the data subcarriers. In one embodiment, the power delay profile (PDP) computation may be performed and used in the interpolation process. FFT/sinc interpolation is then used to estimate the channel for the data subcarriers based in part on the best N taps of the PDP. The combining of the OFDM symbols in the frequency domain results in an increase of the delay spread of the channel that can be estimated using an FFT based interpolation technique.

With continuing reference to FIG. 5, channel tracking, other processing, and/or conversion to the frequency domain can be performed on the foregoing results. Band edge correction also may be applied to improve the channel estimate near the guard bands. Channel tracking can be performed either in the frequency domain or in the time domain (prior to conversion back to the frequency domain), but after symbol combining.

Figure 6:
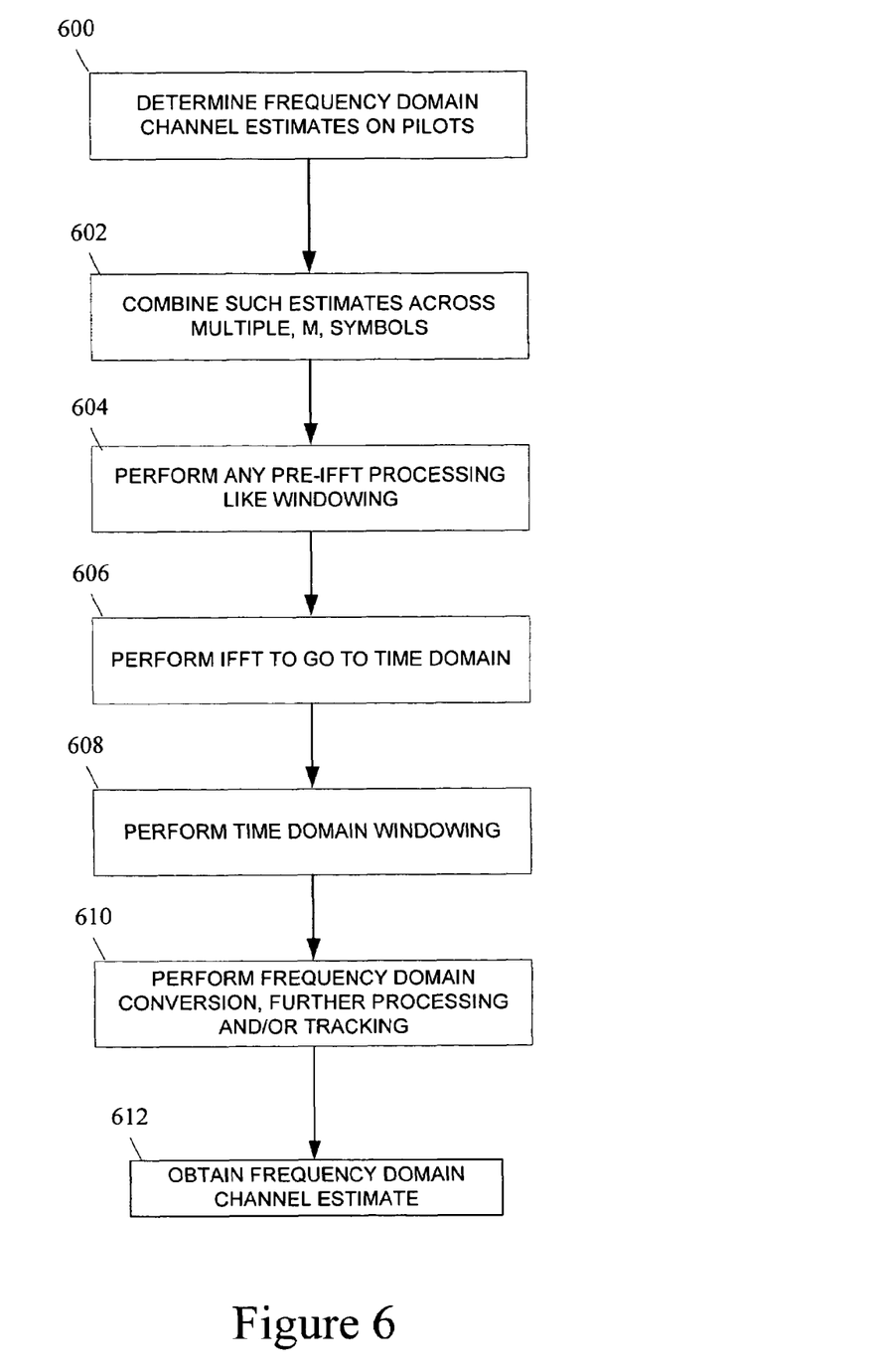
FIG. 6 is a flow diagram for estimating a channel, under an embodiment.

FIG. 6 is a flow diagram for estimating a channel, under an embodiment. At 600, the channel estimates for the received pilots are determined. At 602, the pilot channel estimates for a number of symbols are combined in the frequency domain. At 604, preprocessing operations, such as a frequency domain windowing operation may be performed on the combined pilot channel estimates. Moreover, other interpolation techniques (e.g. linear, etc.) may be employed to obtain the channel estimate on tones which are required to obtain a periodic repetition of pilot tones before going to the next step. This may be done for example when the direct current (DC) tone (which is typically nulled prior to transmission) occurs in one of the repetition patterns.

At 606, the combined symbols are converted to the time domain using an IFFT, such as the IFFT component 108 of FIG. 1. At 608, a windowing operation is used to select one replica of the time domain response in accordance with the sinc interpolation method. In other embodiments, the best N taps of this replica may be chosen. At 610, an FFT is used to return to the frequency domain. Any tracking and other processing operations may be also performed either before or after returning to the frequency domain. It is appreciated that if windowing was used at 604, the frequency domain windowing is then removed.

Figure 7:
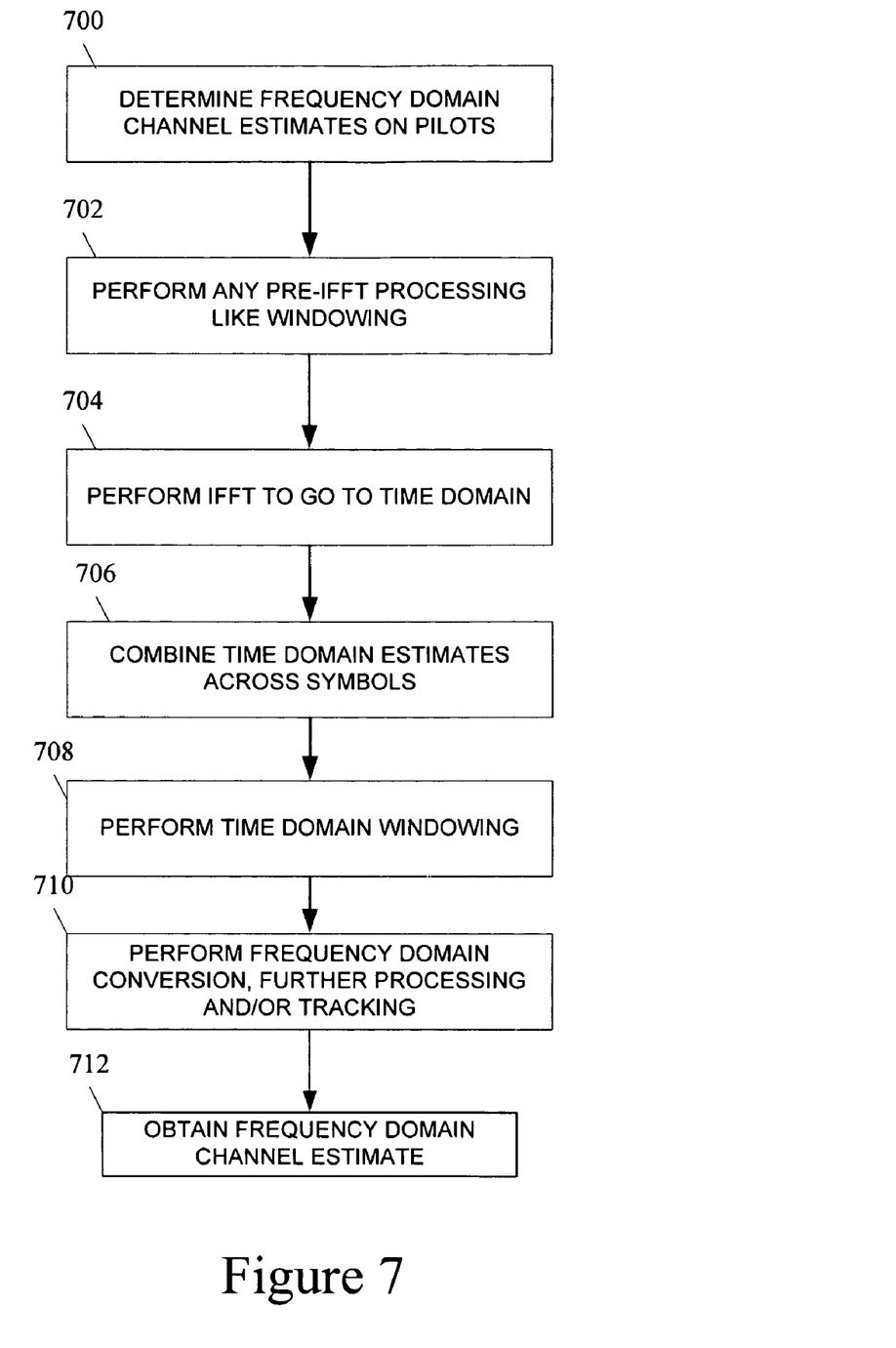
FIG. 7 is a flow diagram for estimating a channel, under an embodiment.

FIG. 7 is a flow diagram for estimating a channel, under an embodiment. At 700, the channel estimates for the received pilots are determined. At 702, preprocessing operations, such as pre-IFFT windowing operations can be performed on the pilot channel estimates. Other operations such as local frequency domain interpolation may be performed to obtain a uniform and desired pilot spacing as required by the sinc interpolation. At 704, the pilot channel estimates are converted to the time domain using an IFFT, such as the IFFT component 108 of FIG. 1. At 706, the time domain channel estimates for a number of symbols are combined. At 708, a windowing operation is used to select one replica of the time domain response in accordance with the sinc interpolation. In an embodiment, the tap locations corresponding to the best N taps of the PDP may be chosen and the rest nulled. At 710, an FFT is used to return to the frequency domain, and/or tracking and other processing operations may be performed.

As described above, systems and methods are provided for improving channel estimation in a wireless system, such as a wireless block transmission system. For example, block transmission systems include, but are not limited to: Orthogonal Frequency-Division Multiplexing (OFDM); Multi-Carrier Code Division Multiple Access (MC-CDMA); Discrete Multi-Tone (DMT). The 802.16e wireless Metropolitan Area Network (MAN) standard incorporates (among other modulation techniques), Orthogonal Frequency Division Multiple Access (OFDMA) (an OFDM technology with multiple access).

In other embodiments, once the best N taps are determined after the symbol combining, subsequent symbol combining for channel estimation may be done in the frequency domain, time domain, and/or in the frequency domain after interpolation. The receiver and associated components described herein may also be components or subsystems within a larger communication system or network. While the MBS mode in a WiMAX system is used for the examples herein, it is to be understood that the embodiments described herein are not limited to such systems.

The systems and methods for channel estimation of an embodiment include a system for communicating signals using a communication channel, the system comprising a receiving component for receiving a signal including a number of symbols. Each symbol of an embodiment comprises a number of data subcarriers and a number of pilot subcarriers. The system of an embodiment includes a combining component for combining a first symbol having data and at least one pilot interspersed with the data and a second symbol having data and at least one pilot interspersed with the data. The combination of the first and second symbols of an embodiment corresponds with an increased pilot density. The system of an embodiment includes an estimating component for estimating a parameter associated with the communication channel using information of the combined first and second symbols.

The first and second symbols of an embodiment are consecutive symbols.

The combining component of an embodiment further combines the second symbol with a third symbol having data and at least one pilot interspersed with the data. The first symbol, second symbol, and third symbol of an embodiment are consecutive symbols.

The combining component of an embodiment combines the second symbol with a third symbol having data and at least one pilot interspersed with the data, and combines the third symbol with a fourth symbol having data and at least one pilot interspersed with the data.

The system of an embodiment includes a transformation component. The combining component of an embodiment combines the first and second symbols using a time domain representation of the first and second symbols after transforming the first and second symbols with the transformation component.

The system of an embodiment includes a transformation component. The combining component of an embodiment combines the first and second symbols using a frequency domain representation of the first and second symbols before transforming the first and second symbols with the transformation component.

The combining component of an embodiment further includes a weighting operation when combining the first and second symbols.

The estimating component of an embodiment determines a power delay profile (PDP) after combining the first and second symbols. A determination of a number of taps of an embodiment is based in part on the PDP.

The system of an embodiment includes a tracking component for tracking the communication channel based on the combination of the first and second symbols.

The systems and methods for channel estimation of an embodiment include a method of communicating signals using a communication channel. The method of an embodiment comprises receiving a signal including a number of symbols. Each symbol of an embodiment is associated with a number of data subcarriers and a number of pilot subcarriers. The method of an embodiment includes combining a first symbol having data and at least one pilot interspersed with the data and a second symbol having data and at least one pilot interspersed with the data. The combining of an embodiment operates to decrease pilot spacing of the combined symbols and increase the delay spread of communication channels that can be estimated. The method of an embodiment includes estimating a parameter associated with the communication channel using information of the combined first and second symbols.

The method of an embodiment includes combining consecutive symbols.

The method of an embodiment includes using a weighting operation when combining the first and second symbols.

The method of an embodiment includes combining a third symbol having data and at least one pilot interspersed with the data with the first and second symbols.

The combining of the first and second symbols of the method of an embodiment is performed in a time domain.

The combining of the first and second symbols of the method of an embodiment is performed in a frequency domain.

The method of an embodiment includes tracking the communication channel estimate based on the combination of the first and second symbols.

The method of an embodiment includes determining a PDP after combining the first and second symbols. The method of an embodiment includes determining a number of taps based in part on the PDP.

The method of an embodiment includes combining the second symbol with a third symbol having data and at least one pilot interspersed with the data. The method of an embodiment includes combining the third symbol with a fourth symbol having data and at least one pilot interspersed with the data.

The systems and methods for channel estimation of an embodiment include a computer readable medium including executable instructions which, when executed in a communication system, use a communication channel by receiving a signal including a number of symbols. Each symbol of an embodiment comprises a number of data subcarriers and a number of pilot subcarriers. The instructions of an embodiment when executed combine a first symbol having data and at least one pilot interspersed with the data and a second symbol having data and at least one pilot interspersed with the data. The combination of the first and second symbols of an embodiment corresponds with an increased pilot density. The instructions of an embodiment when executed estimate a parameter associated with the communication channel using information of the combined first and second symbols.

The instructions of an embodiment when executed use the communication channel by combining consecutive symbols before estimating the parameter associated with the communication channel.

Aspects of the channel estimation described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the channel estimation include: microcontrollers with memory (such as electronically erasable programmable read only memory (EEPROM)), embedded microprocessors, firmware, software, etc. Furthermore, aspects of the channel estimation may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and/or expressed (or represented) as data and/or instructions embodied in various computer-readable media, in terms of their behavioral, functional, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the channel estimation is not intended to be exhaustive or to limit the systems and methods to the precise form disclosed. While specific embodiments of, and examples for, the channel estimation are described herein for illustrative purposes, various equivalent modifications are possible within the scope of other systems and methods, as those skilled in the relevant art will recognize. The teachings of the channel estimation provided herein can be applied to other processing systems and methods, not only for the systems and methods described above.

The elements and acts of the various embodiments described above can be combined to provide further embodiments. These and other changes can be made to the antenna virtualization in light of the above detailed description.

In general, in the following claims, the terms used should not be construed to limit the channel estimation to the specific embodiments disclosed in the specification and the claims, but should be construed to include all communication systems that operate under the claims. Accordingly, the channel estimation is not limited by the disclosure, but instead the scope of the channel estimation is to be determined entirely by the claims.

While certain aspects of the channel estimation are presented below in certain claim forms, the inventors contemplate the various aspects of the channel estimation in any number of claim forms. Accordingly, the inventors reserve the right to add additional claims after filing the application to pursue such additional claim forms for other aspects of the channel estimation.

What is claimed is:

1. A system for communicating signals using a communication channel comprising:
   a receiving component for receiving a signal including a number of symbols, wherein each symbol comprises a number of data subcarriers and a number of pilot subcarriers;
   a combining component for combining a first symbol having data and at least one pilot interspersed with the data and a second symbol having data and at least one pilot interspersed with the data, wherein the first and second symbols are consecutive symbols of a multi-carrier signal, wherein the combination of the consecutive first and second symbols results in a combined symbol having a higher pilot density than the consecutive first and second symbols; and
   an estimating component for estimating a parameter associated with the communication channel using information of the combined symbols.

2. The system of claim 1, wherein the combining component further combines the second symbol with a third symbol having data and at least one pilot interspersed with the data, wherein the first symbol, second symbol, and third symbol are consecutive symbols.

3. The system of claim 1, wherein the combining component further combines the second symbol with a third symbol having data and at least one pilot interspersed with the data, and combines the third symbol with a fourth symbol having data and at least one pilot interspersed with the data.

4. The system of claim 1, further comprising a transformation component, and wherein the combining component combines the first and second symbols using a time domain representation of the first and second symbols after transforming the first and second symbols with the transformation component.

5. The system of claim 1, further comprising a transformation component, and wherein the combining component combines the first and second symbols using a frequency domain representation of the first and second symbols before transforming the first and second symbols with the transformation component.

6. The system of claim 1, wherein the combining component further includes a weighting operation when combining the first and second symbols.

7. The system of claim 1, wherein the estimating component determines a power delay profile (PDP) after combining the first and second symbols, wherein a determination of a number of taps is based in part on the PDP.

8. The system of claim 1, further comprising a tracking component for tracking the communication channel based on the combination of the first and second symbols.

9. A method of a receiver communicating signals using a communication channel comprising:
   the receiver receiving a signal including a number of symbols, wherein each symbol is associated with a number of data subcarriers and a number of pilot subcarriers;
   combining a first symbol having data and at least one pilot interspersed with the data and a consecutive second symbol having data and at least one pilot interspersed with the data, wherein the combining operates to decrease pilot spacing of the combined symbols as compared to the consecutive first and second symbols, and increase the delay spread of communication channels that can be estimated well; and,
   the receiver estimating a parameter associated with the communication channel using information of the combined first and second symbols.

10. The method of claim 9, further comprising using a weighting operation when combining the first and second symbols.

11. The method of claim 9, further comprising combining a third symbol having data and at least one pilot interspersed with the data with the first and second symbols.

12. The method of claim 9, wherein the combining of the first and second symbols is performed in a time domain.

13. The method of claim 9, wherein the combining of the first and second symbols is performed in a frequency domain.

14. The method of claim 9, farther comprising tracking the communication channel estimate based on the combination of the first and second symbols.

15. The method of claim 9, further comprising determining a PDP after combining the first and second symbols, and determining a number of taps based in part on the PDP.

16. The method of claim 9, further comprising combining the second symbol with a third symbol having data and at least one pilot interspersed with the data, and combining the third symbol with a fourth symbol having data and at least one pilot interspersed with the data.

* * * * *